No. 631,187. Patented Aug. 15, 1899.
C. STEELE.
GATE.
(Application filed Apr. 25, 1899.)
(No Model.) 2 Sheets—Sheet I.
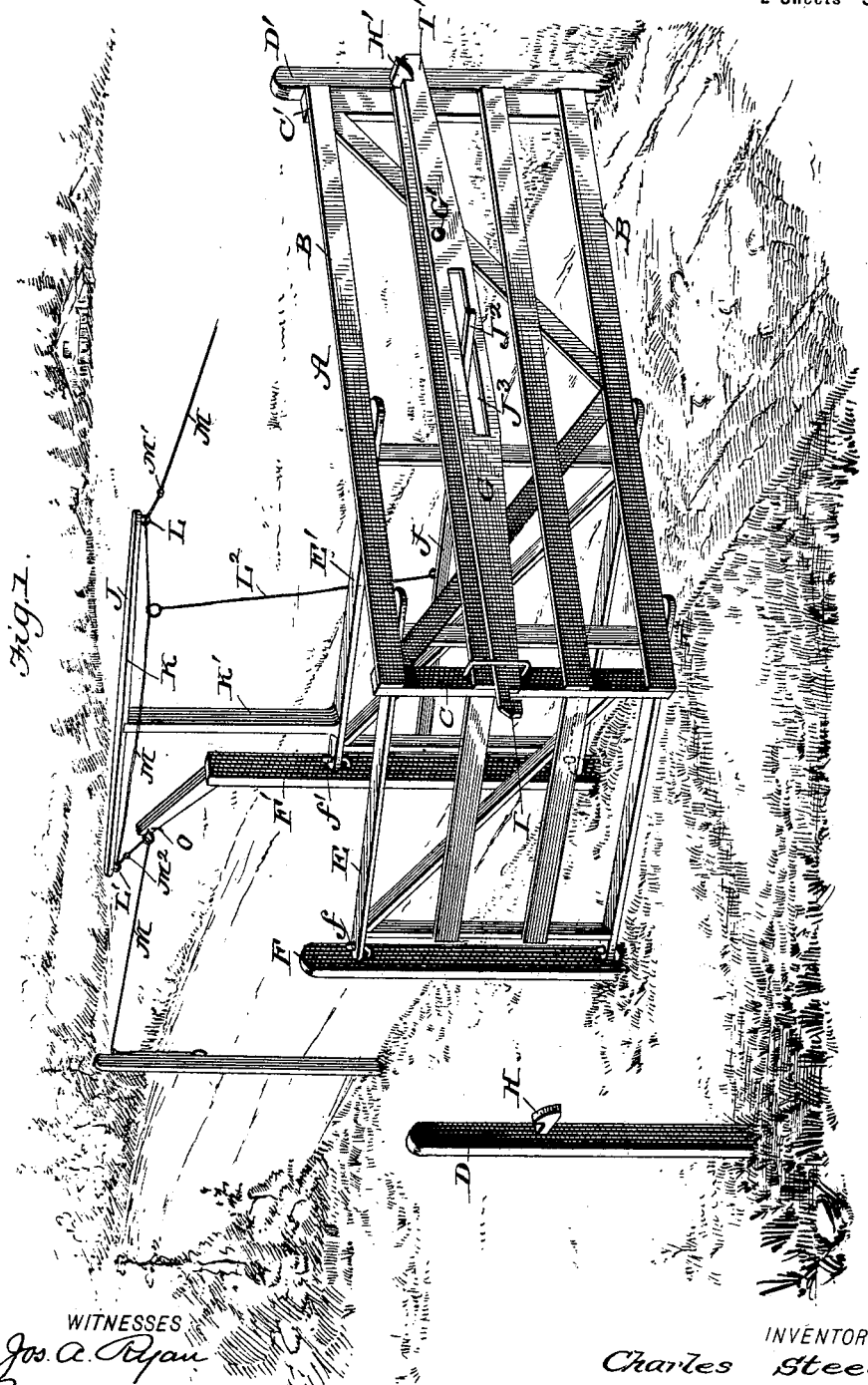
WITNESSES
INVENTOR
Charles Steele.
BY
ATTORNEYS.

No. 631,187. Patented Aug. 15, 1899.
C. STEELE.
GATE.
(Application filed Apr. 25, 1899.)
(No Model.) 2 Sheets—Sheet 2.
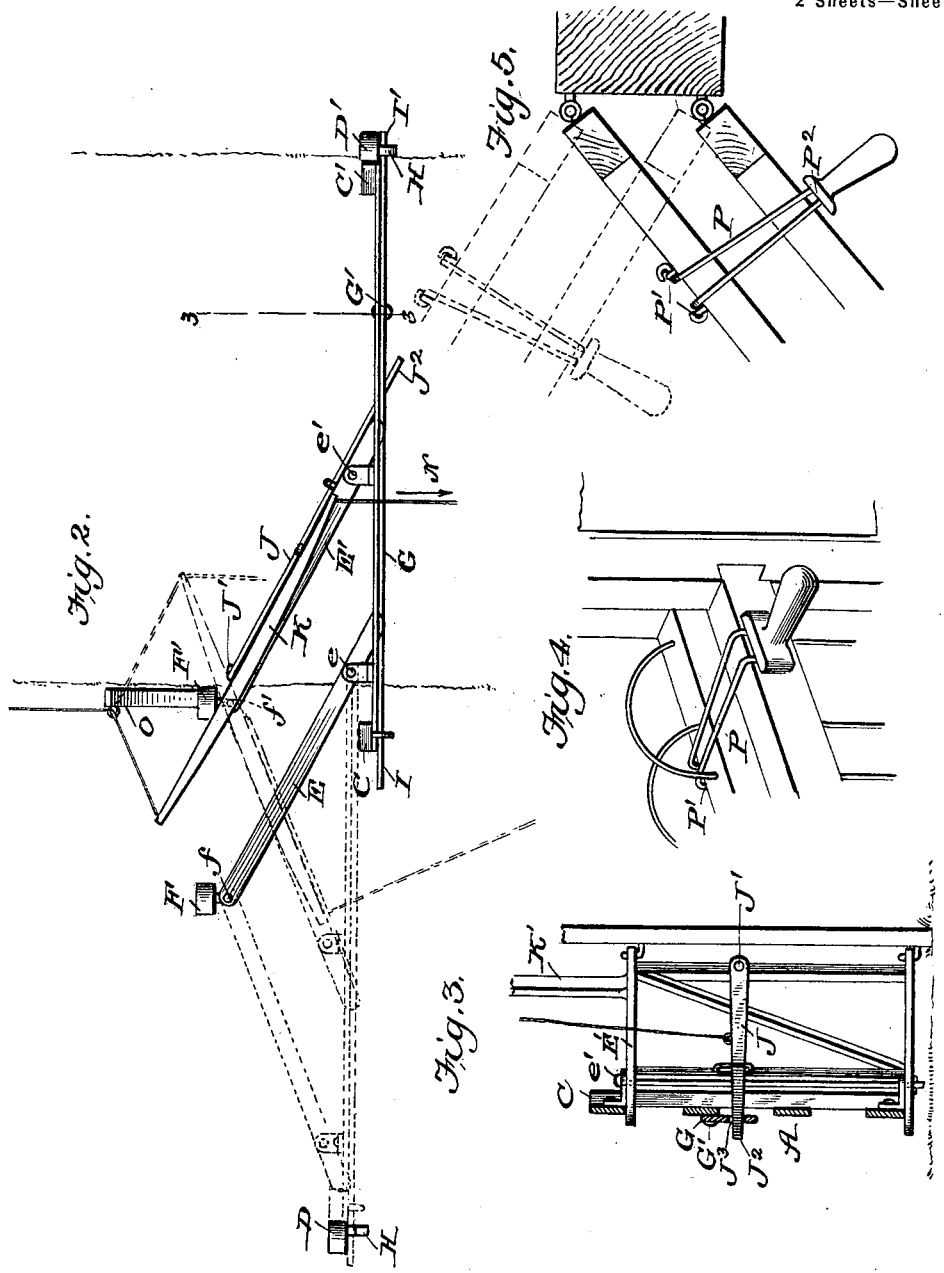
WITNESSES:
Jos. A. Ryan
Percy B. Turpin
INVENTOR
Charles Steele
BY Munn & Co.
ATTORNEYS.

UNITED STATES PATENT OFFICE.

CHARLES STEEL, OF ETHRIDGE, TENNESSEE.

GATE.

SPECIFICATION forming part of Letters Patent No. 631,187, dated August 15, 1899.

Application filed April 25, 1899. Serial No. 714,447. (No model.)

*To all whom it may concern:*

Be it known that I, CHARLES STEEL, a citizen of the United States, residing at Ethridge, in the county of Lawrence and State of Tennessee, have made certain new and useful Improvements in Gates, of which the following is a specification.

My invention is an improvement in gates, and especially in gates arranged for automatic operation, so they can be readily opened and closed by the operator as he approaches and after he has passed through the gate; and the invention consists in certain novel constructions and combinations of parts, as will be hereinafter described, and pointed out in the claims.

In the drawings, Figure 1 is a perspective view of my gate. Fig. 2 is a top plan view thereof. Fig. 3 is a cross-sectional view on about line 3 3 of Fig. 2, and Figs. 4 and 5 are detail views illustrating a somewhat different form of latch from that shown in Figs. 1, 2, and 3.

The gate proper, A, may in general respects be of ordinary construction, having the bars B and the end battens C and C', which move, respectively, to and from the latch-posts D and D', as best shown in Fig. 1.

In the position shown in Fig. 1 the gate proper extends across the roadway. This is the same position shown in full lines in Fig. 2, and the gate may be adjusted from such position to the dotted-line position shown in Fig. 2, where it will be clear of the roadway and latched to the post D, as will be better understood from what follows.

The gate A is carried by the swinging supports or frames E and E', which are pivoted at their outer ends $e$ and $e'$ to the gate A and at their other ends at $f$ and $f'$ to the posts F and F'. The arrangement of the frames E and E' is such that they operate after the fashion of a parallel-ruler in the movement of the gate A to the different positions shown and indicated in Fig. 2 and at the same time furnish a simple, strong, and easily-operated construction by which to support the gate.

In the broad features of my invention the gate, as above described, might be operated by hand and any suitable form of latch device might be employed for securing the gate to the latch-posts D and D'. I prefer, however, to employ the means for operating the gate as one approaches or recedes therefrom. The latch shown consists of a bar extending lengthwise the gate and from end to end thereof and projecting at its opposite ends beyond the ends of the gate. This bar G is pivoted at G' off its center, so that one end will overbalance the other, and it moves at its opposite ends in opposite directions into and out of engagement with the seats H and H' on the posts D and D', dropping at its end I into engagement with the seat H and rising at its end I' into engagement with the seat H'. It will be understood from Fig. 1 that the same movement of the latch-bar G will release it from either of its seats H and H'. To operate the latch-bar G, I provide the operating-bar J, which is pivoted at J', near one end, so that its other end may swing vertically, and is passed at its swinging end $J^2$ through a slot $J^3$, formed longitudinally in the latch-bar, so that the swinging end of the bar J will not interfere with the lateral movements of the gate and yet can operate the latch-bar G in any position of the gate.

In operation the operating-bar J is first moved to release the latch from its seats H or H' and the gate is then swung from open to closed position, or vice versa. To this end I provide on one of the frames E E' a lever-arm K, supported at its center by the upright K' on such frame, preferably that next to the roadway, and having near its ends guides L and L' for the operating-cord M, which has a limited play through the guides L L' sufficiently long to permit the first stress on the line M to release the latch G through the connection $L^2$ between the bar J and the cord M, the connection $L^2$ being secured to the cord M between the guides L L', and the movement of the cord M through the guides L L' being limited by the knots or similar projections M' and $M^2$ on the cord M, as shown in Fig. 1. The cord M after it passes through the guides L and L' is suitably supported and guided into position where it can be conveniently reached by one passing along the road and so it will swing the gate from one position to the other after the operating-bar J has released the latch. In the position shown in Fig. 2 the lever-arm K is at such an angle to the roadway that if the cord M is drawn upon in the direction indicated by the arrow N, Fig. 2, the gate will be swung to the dotted position shown in said figure. In guiding the cord M on the opposite side of the gate it is preferred to use a guide O for the cord, as shown in Figs. 1 and 2.

Instead of arranging the latch to engage seats on the opposite latch-post D and D', I may in some instances employ the form of latch shown in Figs. 4 and 5, in which the latch P is pivoted at P' to one of the swinging frames and drops at its opposite end P² over the other frame, the latch dropping by gravity into latched position and being released by the first impulse on the operating-cord, as will be understood from Figs. 4 and 5.

It will be understood that when the gate is positively started toward its open or closed position it will complete such movement by its momentum.

Having thus described my invention, what I claim, and desire to secure by Letters Patent, is—

1. The improvement in gates herein described comprising the gate proper, the swinging frames supporting the same, the latch-bar carried by the gate and the operating-bar carried by one of the swinging frames and engaging the latch-bar, substantially as set forth.

2. The combination of the gate proper, the latch-bar extending longitudinally thereon and having a longitudinal slot, the swinging frames supporting the gate proper and the operating-bar carried by one of the swinging frames and operating in the longitudinal slot of the latch-bar, substantially as set forth.

3. The improved gate herein described comprising the gate proper, the swinging frames supporting the same and arranged to operate after the fashion of a parallel-ruler, the lever-arm supported on one of the swinging frames, and the operating-cord, substantially as set forth.

4. The combination of the gate proper, the plurality of swinging frames, the latch devices, the lever-arm supported on one of the swinging frames and having guides for the operating-cord, the cord having limited movement in said guides and connections between said cord and the latch devices, substantially as set forth.

5. The combination with the latch-posts and the gate proper swinging bodily between the said posts, of the latch-bar extending longitudinally of the gate and arranged at one end to engage one latch-post when the gate is open, and at its other end to engage the other latch-post when the gate is closed, substantially as set forth.

6. The improved gate herein described, comprising the gate proper, the latch extending lengthwise thereof and from end to end of same and having the longitudinally-elongated slot, the swinging frames supporting the gate proper and arranged to operate after the fashion of a parallel-ruler, the operating-bar pivoted at one end to one of the swinging frames and operating at its other end in the slot of the latch-bar, the lever-arm supported on one of the swinging frames and having guides for the cord, the cord having a limited movement in said guides, and connections between said cord and the latch-operating bar, substantially as set forth.

CHARLES STEEL.

Witnesses:
   W. B. SULLIVAN,
   SAML. BUCHANAN.